Oct. 27, 1970 MIKIO UEMURA ET AL 3,536,937

SWITCH CHANGING CONDUCTIVE STATES WHEN METAL OBJECT MOUNTED THEREON MOVES IN AND OUT OF SELF-GENERATED REFERENCE FIELD

Filed Aug. 18, 1966

MIKIO UEMURA
SABURO TAKECHI
KENZI IIO
INVENTORS

BY Christensen, Sanborn & Matthews
ATTORNEYS

United States Patent Office 3,536,937

Patented Oct. 27, 1970

3,536,937

SWITCH CHANGING CONDUCTIVE STATES WHEN METAL OBJECT MOUNTED THEREON MOVES IN AND OUT OF SELF-GENERATED REFERENCE FIELD

Mikio Uemura, Saburo Takechi, and Kenzi Iio, Kyoto, Japan, assignors to Omron Tateisi Electronics Co., Kyoto, Japan, a company of Japan Filed Aug. 18, 1966, Ser. No. 573,330
Claims priority, application Japan, Aug. 18, 1965, 40/67,945
Int. Cl. H03k *17/00*
U.S. Cl. 307—305 4 Claims

ABSTRACT OF THE DISCLOSURE

A proximity switch which is convertible from a normally open to a normally closed type, or vice versa, by the simple positioning of a metallic object in or outside of the field of an internal secondary coil. The circuit employs an oscillator having a primary coil in its resonant circuit, inductively coupled with first and second secondary coils connected in series opposed relationship to each other whereby a difference voltage is generated to operate output switching circuitry. The first secondary coil generates a pick-up or sensing field and the second generates a reference field into which a metallic object is positionable to predetermine whether the output switching circuit will switch from on to off condition or from off to on when an object enters the pick-up field.

BACKGROUND AND SUMMARY OF THE INVENTION

This invention relates to a switch and more particularly to a switch which can be easily converted from a normally open to a normally closed type, or vice versa.

As is well known, there are two types of proximity switches. One is the type that produces an output when an object enters the field of the pickup of the switch, while the other is the type in which, upon entrance of an object into the field of the pickup, the output that has been existing disappears. Proximity switches generally include an oscillating circuit. By designing the oscillating circuit to have a suitable oscillating condition, it is possible to provide either one of the two types of proximity switches. However, once a proximity switch of one of the two types has been constructed, it is difficult to convert it into the other type, because such conversion requires decomposition of the switch and installation thereinto of different circuit elements having different constants.

There is known a switching device such as a limit switch which utilizes a micro-switch having a mechanical movable contact arm and a plurality of stationary contacts. In such a switch, the movable arm is normally in contact with one of the contacts and is moved by an object such as a machine part hitting it into contact with the other contact, thereby closing or opening a circuit. If the switch is of a normally closed type, it is easy to change it to a normally open type, and vice versa, by simply disconnecting the circuit to be controlled from one of the fixed contacts to the other. However, if a switching device is of a contactless type without any mechanical contacts, it is not easy to convert a normally closed type into a normally open type, or vice versa.

Accordingly, it is one object of the invention to provide a proximity switch which can be easily and selectively converted from one of the above-mentioned two types into the other, without substantially changing the circuit elements.

Another object of the invention is to provide a proximity switch which comprises an oscillator having a pair of electromagnetically coupled oscillating coils, one of which is adapted to detect an object entering its field, while the other coil has placed in its field a metallic piece, which is selectively removable from the field. The two coils are connected in a series opposed relation, so that so long as neither any object to be detected nor the metallic piece exists in the fields of the two coils, or an object to be detected and the metallic piece exists in the two fields, respectively, the voltages induced in the two coils are substantially equal or nearly equal and oppose each other, so that very little or no voltage appears across the series combination of the two coils. If one of the two coils only has an object in its field, or the other coil only has the metallic piece in its field, there is a difference in the induced voltages between the two coils, so that a voltage equal to the difference appears across the series combination of the two coils. In such an arrangement, with the metallic piece placed in the field of one of the coils, as an object comes into the field of the other coil, the voltage across the series combination of the two coils decreases to zero or nearly zero. On the contrary, with the metallic piece having been removed from the field of the coil, when an object to be detected enters the field of the other coil, the voltage across the series combination increases from zero to a predetermined value. Thus, depending upon the presence or absence of the metallic piece in the field of one of the two coils, the voltage across the series opposed combination of the two coils varies differently upon entrance of an object to be tested into the field of the other coil. If the voltage across the series opposed combination of the two coils is to be utilized as a test by which to recognize the approach of an object to be detected, by simply placing the metallic piece in the field of one of the two coils or removing it therefrom, it is possible to convert the switch from the type in which a signal is produced upon approach of an object to the type in which approach of an object causes the existing signal to disappear, without ever changing the other component parts of the switch.

The invention, its above-stated and other objects, features and advantages will be better understood from the following detailed description thereof with reference to the accompanying drawings, wherein.

Figures 1, 2, 3, 4:
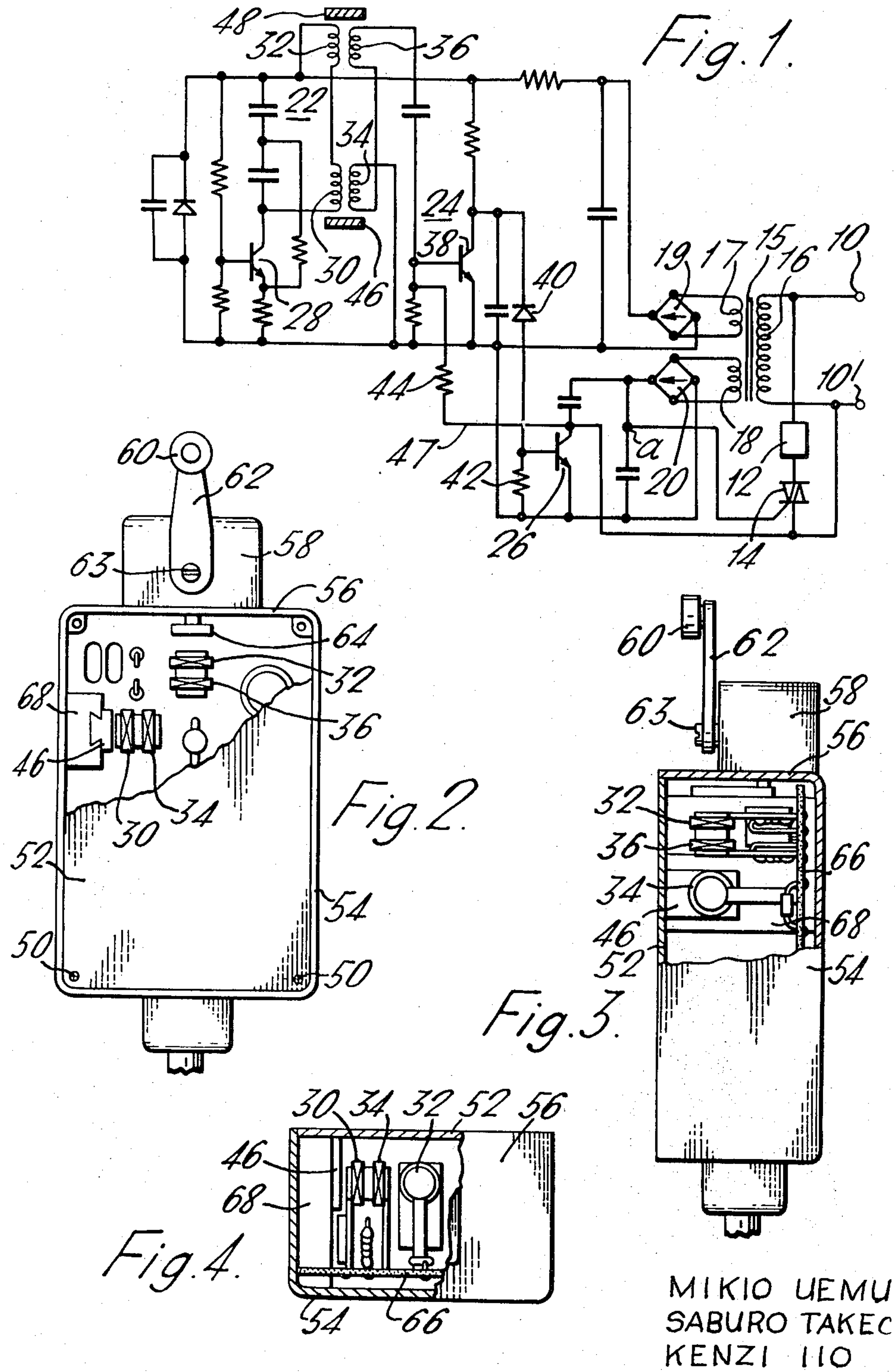
FIG. 1 is a circuit diagram of one embodiment of the invention.
FIG. 2 is a partly cut-away front view of a limit switch to which the invention is applied.
FIG. 3 is a partly cut-away side view of the switch of FIG. 2.
FIG. 4 is a partly cut-away top plan view of the switch of FIG. 2, with the movable arm and its associated parts having been removed.

Referring now in detail to the drawings, first to FIG. 1, an alternating voltage is impressed across a pair of terminals 10 and 10', between which is connected a series combination of a load circuit 12 and a switch 14 for opening and closing the load circuit. The switch 14 preferably is a diode switching element such as a bilateral controlled rectifier commercially available in Japan under the trademark of TRIAC.

A source transformer 15 has its primary winding 16 connected between the terminals 10 and 10' and its two secondary windings 17 and 18 connected to rectifiers 19 and 20, respectively. The direct current voltage from the rectifier 19 is applied to an oscillator 22 and an amplifier 24 comprising a transistor 38, while the direct current voltage from the other rectifier 20 is applied to the control electrode of the element 14. A switching device comprising a transistor 26 is connected in series with the control electrode of element 14 between the output terminals of rectifier 20. Oscillator 22 is shown of the Colpitts type including a transistor 28, but may be of any other suitable type. The oscillator has its output coil divided into two coils 30 and 32, which may be a single coil. A pair of coils 34 and 36 are electromagnetically coupled with the coils 30 and 32, respectively, and are connected in series opposed relation to each other. It will be seen that the voltages induced in the two coils oppose each other, and the difference therebetween appears across the series opposed combination of the two coils. This voltage is then applied to the base of the transistor amplifier 38. The amplified output voltage, that is, the collector voltage of the transistor 38 is applied across a series combination of a Zener diode 40 and a resistor 42. The voltage across the resistor 42 is applied to the base of the transistor 26 as a signal to operate the transistor. In order to enable a quick action of the switching transistor 26, a positive feed back circuit 47 connects the collector of the transistor 26 and the base of the transistor 38.

Characteristic of the invention is the provision of a metallic piece 46 adapted to be selectively placed in or removed out of the field of the coils 30 and 34. A metallic object to be detected is shown at 48 in the field of the other coils 32 and 36.

Suppose that no object to be detected exists in the field of the coils 32 and 36, with the metallic piece 46 having been removed from the field of the coils 30 and 34. Under this condition, if the oscillator 22 is oscillating and the induced voltages in the two coils 34 and 36, respectively, are substantially equal, the input to the amplifier 24 is zero or nearly zero, so that the transistor 38 is not conducting. As a result, the direct current output voltage from the rectifier 19 applied to the Zener diode 40 exceeds the Zener voltage so that a current flows through the resistor 42, the terminal voltage of which is apolied to the base of the transistor 26 to render it conducting. This causes the direct current from the rectifier 20 to flow through the junction *a*, the control electrode of the element 14 and the transistor 26, so that the element 14 is rendered conducting, and the alternating current voltage between the terminals 10 and 10' is applied to the load 12.

When the object 48 enters the field of the coils 32 and 36, a difference occurs between the voltages induced in the coils 34 and 36 and the difference renders the transistor 38 conducting. As a result, the voltage that has been impressed on the Zener diode 40 is reduced below the Zener voltage so that the transistor 26 is rendered nonconducting. This means that now there is no signal applied to the control electrode of the element 14, so that the element 14 is cut off and consequently, no current flows through the load 12.

In the above instance, normally the alternating current flows through the load and when the object 48 approaches, the current flow is cut off.

Suppose that the metallic piece 46 is placed in the field of the coils 30 and 34. If there is no object in the field of the coils 32 and 36, the voltages induced in the coils 34 and 36 differ from the beginning, so that no current flows through the load 12. Then when the object 48 comes in, the voltages induced in the coils 34 and 36 become equal and oppose each other, so that current flows through the load. The course of events in this instance is opposite to that in the previous case and will be easily understood therefrom so that no further explanation will be required.

It may be mentioned that the high frequency magnetic fields of the coils 30 and 34 or 32 and 36 produce in the object or the metallic piece placed therein eddy currents, which cause losses to the fields, so that the voltage induced therein differs from that induced if there is no such metallic piece in the fields. Thus, in accordance with the invention, when the metallic piece 46 is placed in the field of the coils 30 and 34, the output condition of the device varies in a manner opposite to that if the metallic object has been removed from the field. In other words, according to the invention, by simply placing a metallic piece in position or removing it therefrom, it is possible to convert the same switch from a normally open type to a normally closed type or vice versa.

Referring to FIGS. 3 and 4, there is shown a limit switch to which the invention is applied. A casing 54 has a front cover 52 detachably secured thereto by screws 50. The circuit elements of FIG. 1 except the load circuit 12 is enclosed in the casing. On the upper wall 56 of the casing there is mounted another casing 58. A lever 62 is pivoted at its lower end to the front of the upper casing 58 by a pin 63 and provided at its upper end with a roller 60. A moving object hitting on the roller 60 causes the lever 62 to be rotated about the pin 63. The rotation of the lever is translated by a suitable drive connection (not shown) provided in the casing 58 to downward movement of a metallic piece 64.

A plate 66 inside the casing supports the various circuit elements of FIG. 1. That is, the coils 32 and 36 are arranged just below the metallic piece 64 and the metallic piece 46 is supported by a support member 68 so as to be selectively moved into or out of the field of the coils 30 and 34. The front cover 52 is removed for insertion or removal of the metallic piece 46 into or out of the support 68. The other circuit elements of FIG. 1 are supported by plate 66, but not designated by numerals in FIGS. 2 through 4.

It will be seen that the metallic piece 64 corresponds to the object 48 to be detected in FIG. 1. Consequently, upon rotation of the lever 62, the metallic member 64 is lowered into the field of the coils 32 and 36, so that depending upon the presence or absence of the metallic piece 46 in the field of the coils 30 and 34, the switch closes or opens a load circuit upon approach of the metallic member 64 to the coils 32 and 36. In other words, the switch functions as a normally open or closed switch, depending upon whether the metallic piece 46 is inserted into place or pulled out therefrom.

Having illustrated and described one preferred embodiment of the invention, it is understood that the invention is never limited thereto, but that there are many modifications and changes within the scope of the invention as defined in the appended claims.

What we claim is:

1. A limit switch comprising:

(a) an oscillator circuit;

(b) an output switch element having first and second operative states and responsive to oscillation conditions of said oscillator;

(c) inductive coupling means between said oscillator circuit and said output switch element, including:

(1) first inductively coupled primary and secondary coil means for generating a pickup field for sensing proximity of a metal object, and (2) second inductively coupled primary and secondary coil means for generating a reference field;

(d) a casing in which said inductively coupled primary and secondary coil means and said reference object supporting means are mounted;

(e) a metal object mounted in said casing for movement into and out of said pickup field;

(f) an actuator arm for moving said metal object into and out of said pickup field in response to contact of an external object with said arm;

(g) means for supporting a reference object of predetermined electromagnetic characteristic in said reference field;

(h) a detachable lid portion of said casing for gaining access to said reference object supporting means; and (i) circuit means coupling said first and second secondary coil means to said output switch element and operative upon entry of said metal object into said pickup field (1) to switch said output switch element from its first to its second operative state when said reference object is supported in said reference field, and (2) to switch said output switch element from its second to its first state when said reference object is not supported in said field.

2. A limit switch comprising:

(a) input circuit means for providing an alternating output signal;

(b) an output switch element having first and second operative states and responsive to the output signal conditions of said input circuit means;

(c) inductive coupling means between said input circuit means and said output switch element, including:

(1) first inductively coupled primary and secondary coil means for generating a pickup field for sensing proximity of a metal object, and (2) second inductively coupled primary and secondary coil means for generating a reference field;

(d) a casing in which said inductively coupled primary and secondary coil means and said reference object supporting means are mounted;

(e) a metal object mounted in said casing for movement into and out of said pickup field;

(f) an actuator arm for moving said metal object into and out of said pickup field in response to contact of an external object with said arm;

(g) means for supporting a reference object of predetermined electromagnetic characteristic in said reference field;

(h) a detachable lid portion of said casing for gaining access to said reference object supporting means; and (i) output circuit means coupling said first and second secondary coil means to said output switch element and operative upon entry of said metal object into said pickup field (1) to switch said output switch element from its first to its second operative state when said reference object is supported in said reference field, and (2) to switch said output switch element from its second to its first state when said reference object is not supported in said field.

3. The limit switch defined in claim 2 wherein said output switch element comprises a static electronic switch having conductive and nonconductive states for opening and closing a load circuit.

4. The limit switch defined in claim 1 wherein said output switch element comprises a static electronic switch having conductive and nonconductive states for opening and closing a load circuit.

References Cited

UNITED STATES PATENTS

| | | | |
|---|---|---|---|
| 2,966,582 | 12/1960 | Wachtel | 340—258 |
| 3,161,387 | 12/1964 | Jutier | 331—65 X |
| 3,207,917 | 9/1965 | Martin. | |
| 2,439,711 | 4/1948 | Bovey | 336—135 |
| 3,017,699 | 1/1963 | Eckl et al. | 328—5 |

JOHN S. HEYMAN, Primary Examiner

B. P. DAVIS, Assistant Examiner

U.S. Cl. X.R.

307—252; 328—5; 340—258